(12) United States Patent
Gurupackiam

(10) Patent No.: US 11,820,438 B2
(45) Date of Patent: Nov. 21, 2023

(54) WHEEL JACK HOLDER FOR VEHICLE

(71) Applicants: HYUNDAI MOTOR COMPANY, Seoul (KR); Kia Corporation, Seoul (KR)

(72) Inventor: Lakshmanaraj Gurupackiam, Tamil Nadu (IN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 86 days.

(21) Appl. No.: 17/513,193

(22) Filed: Oct. 28, 2021

(65) Prior Publication Data
US 2023/0065781 A1     Mar. 2, 2023

(30) Foreign Application Priority Data

Aug. 25, 2021   (IN) .............................. 202111038484

(51) Int. Cl.
| | | |
|---|---|---|
| *B60R 11/06* | (2006.01) | |
| *B62D 43/00* | (2006.01) | |
| *B60R 1/06* | (2006.01) | |
| *B66F 3/12* | (2006.01) | |

(52) U.S. Cl.
CPC .............. *B62D 43/002* (2013.01); *B60R 1/06* (2013.01); *B66F 3/12* (2013.01)

(58) Field of Classification Search
CPC ...................................................... B60R 11/06

USPC ........................................................ 224/42.27
See application file for complete search history.

(56) References Cited

U.S. PATENT DOCUMENTS

| | | | |
|---|---|---|---|
| 1,881,222 A * | 10/1932 | Nichols .................. | B62D 43/00 254/95 |
| 7,036,697 B2 * | 5/2006 | Hwang .................... | B60R 11/06 206/373 |
| 9,115,740 B2 * | 8/2015 | Chang ................... | F16M 11/043 |
| 9,457,723 B2 * | 10/2016 | Engerman ............... | B60R 11/06 |
| 9,539,957 B2 * | 1/2017 | Engerman ................ | B25H 5/00 |
| 9,821,729 B2 | 11/2017 | Zhou et al. | |
| 2015/0014610 A1 | 1/2015 | Xu et al. | |
| 2016/0362066 A1 * | 12/2016 | Lee ......................... | F16M 13/02 |

FOREIGN PATENT DOCUMENTS

WO     2014-003315 A1     1/2014

* cited by examiner

*Primary Examiner* — Scott T McNurlen
(74) *Attorney, Agent, or Firm* — MORGAN, LEWIS & BOCKIUS LLP

(57) ABSTRACT

A wheel jack holder for a vehicle may include a holder base having at least one sliding member formed at each of first and second side portions of the holder base, whereby a wheel jack is configured for being placed on the holder base; and a pair of holder arms, each having a sliding rod formed at a first surface thereof, wherein the sliding rod is slidably inserted into a hole of the sliding member. The pair of holder arms may move away from each other when receiving force from the wheel jack to be fixed to a wheel rim of a wheel.

8 Claims, 9 Drawing Sheets

WHEEL JACK HOLDER FOR VEHICLE

CROSS-REFERENCE TO RELATED APPLICATION

The present application claims priority to and the benefit of Indian Patent Application No. 202111038484 filed in the Indian Patent Office on Aug. 25, 2021, the entire contents of which are incorporated herein by reference.

BACKGROUND OF THE INVENTION

Field of the Invention

The present invention relates to a wheel jack holder for a vehicle. More particularly, the present invention relates to a wheel jack holder for a vehicle that can store a wheel jack and tools for a vehicle in a wheel, particularly a spare wheel.

Description of Related Art

Many vehicles carry a spare wheel with them in case that a wheel being used becomes damaged or in case of a flat tire. Furthermore, many vehicles also carry tools such as a wheel jack to lift a vehicle body to replace damaged wheels and flat tires.

In general, a spare wheel is detachably mounted on a vehicle body in a trunk of a vehicle, and tools such as a wheel jack are provided in the spare wheel through a separate structure which may be accommodated in a space within the spare wheel.

Since the spare wheel may be manufactured in various dimensions depending on a type of the vehicle, the separate structure must also be customized according to the dimension of the spare wheel. If the separate structure is not manufactured according to the dimension of the spare wheel, the spare wheel accommodating the tools such as the wheel jack moves while the vehicle travels and noise may occur.

Furthermore, to replace the wheel being used with the spare wheel, the separate structure must be removed from the spare wheel and tools such as the wheel jack must be separated from the separate structure. In the present case, the separate structure should be stored in the trunk of the vehicle while the spare wheel is mounted.

Furthermore, to store the used wheel in the trunk of the vehicle, it may be inconvenient to take out the separate structure from the trunk again, store the used wheel in the trunk of the vehicle, and then store the separate structure in the used wheel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wheel jack holder for a vehicle having advantages of storing tools such as a wheel jack for a vehicle in a spare wheel.

Various aspects of the present invention are directed to providing a wheel jack holder for a vehicle which may be easily mounted to and detached from the spare wheel.

A wheel jack holder for a vehicle according to various exemplary embodiments of the present invention may include a holder base having at least one sliding member formed at each of first and second side portions of the holder base, whereby a wheel jack is configured for being placed on the holder base; and a pair of holder arms, each having a sliding rod formed at a first surface thereof, wherein the sliding rod is slidably inserted into a hole of the sliding member. The pair of holder arms may move away from each other when receiving force from the wheel jack to be fixed to a wheel rim of a wheel.

Each holder arm may be provided with a pad at the other surface.

A mount protrusion may be formed at the one surface of the holder arm above the sliding rod, and the wheel jack may apply the force to the holder arm through the mount protrusion.

An elastic member may be provided between the holder base and each holder arm.

At least one tool groove may be formed at an upper surface of the holder base and a supporting edge portion may be protruded downwardly from a lower surface of the holder base.

A wheel nut recess may be further formed at the upper surface of the holder base.

A wheel jack holder for a vehicle according to various exemplary embodiments of the present invention is used to fix a wheel jack to a wheel rim of a wheel. The wheel jack may include a jack base provided at one end portion in a first direction thereof, a supporting plate provided at the other end portion in the first direction thereof, and a jack screw receiving member having a hole and a jack screw rod provided in a second direction perpendicular to the first direction and threaded to each other. The supporting plate and the jack base move in the first direction when the jack screw rod rotates about the second direction thereof.

The wheel jack holder may include: a holder base having at least one sliding member formed at first and second end portions of the holder base in the first direction thereof, wherein the wheel jack is configured for being placed on the holder base; a pair of holder arms, each having a sliding rod formed at a first surface in the first direction thereof, wherein the sliding rod is slidably inserted into the sliding member in the first direction thereof and an elastic member provided between the holder base and each holder arm. The wheel jack may be fixed to the wheel rim of the wheel through the jack base and the supporting plate by pushing the pair of holder arms in the first direction thereof.

Each holder arm may be provided with a pad at the other surface in the first direction thereof.

A mount protrusion may be formed at the first surface of the holder arm in the first direction above the sliding rod, and the jack base and the supporting plate of the wheel jack may apply force to the holder arm through the mount protrusion.

At least one tool groove and a wheel nut recess may be formed at an upper surface of the holder base and a supporting edge portion may be protruded downwardly from a lower surface of the holder base.

According to various exemplary embodiments of the present invention, it is possible to easily mount and detach a tool such as a wheel jack for a vehicle to a spare wheel.

Furthermore, due to the holder arm that can move forwards and backwards with respect to the holder base, the wheel jack holder may be commonly used for spare wheels of various sizes.

Furthermore, various tools necessary for vehicle maintenance or replacement of the spare wheel may be stored in the spare wheel by providing a space for storing the tools such as a wheel wrench, a bar and a toe hook in the holder base.

Furthermore, other effects of the exemplary embodiments of the present invention should be explicitly or implicitly described in the description provided herein. Various effects predicted according to the exemplary embodiments of the present invention will be disclosed in the description provided herein.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
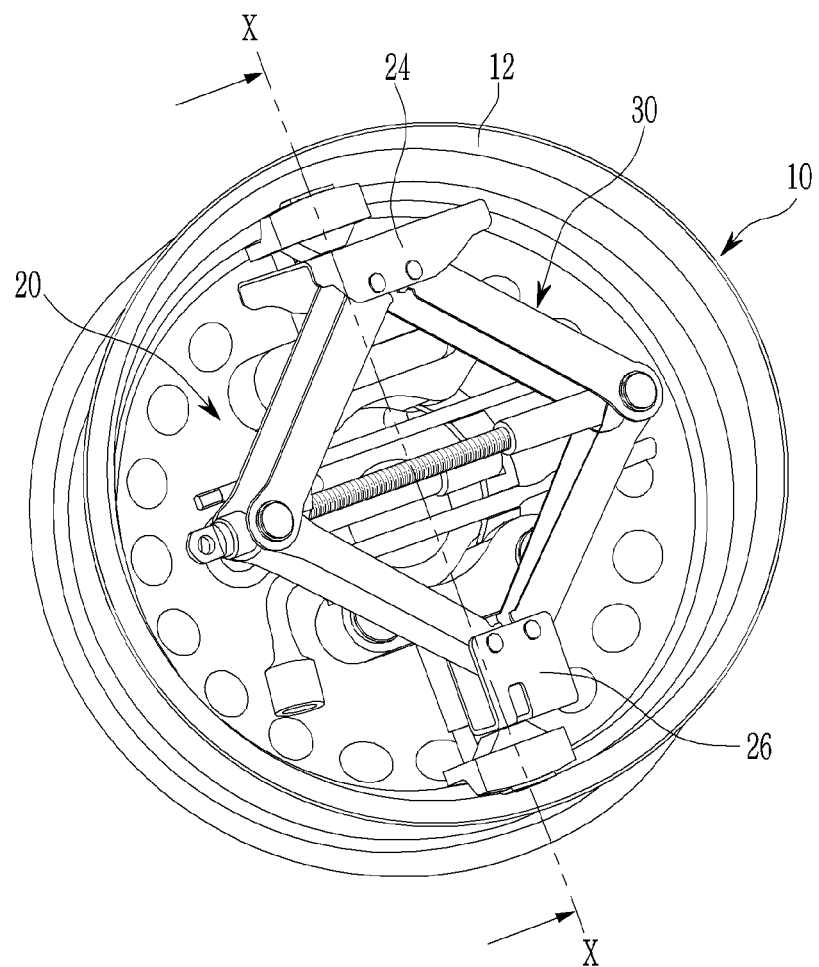
FIG. 1 is a perspective view of a wheel for a vehicle, particularly a spare wheel on which a wheel jack holder according to various exemplary embodiments of the present invention is mounted.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The terminology used herein is for the purpose of describing various exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger vehicles including sports utility vehicles (SUV), buses, trucks, and various commercial vehicles.

Figure 2:
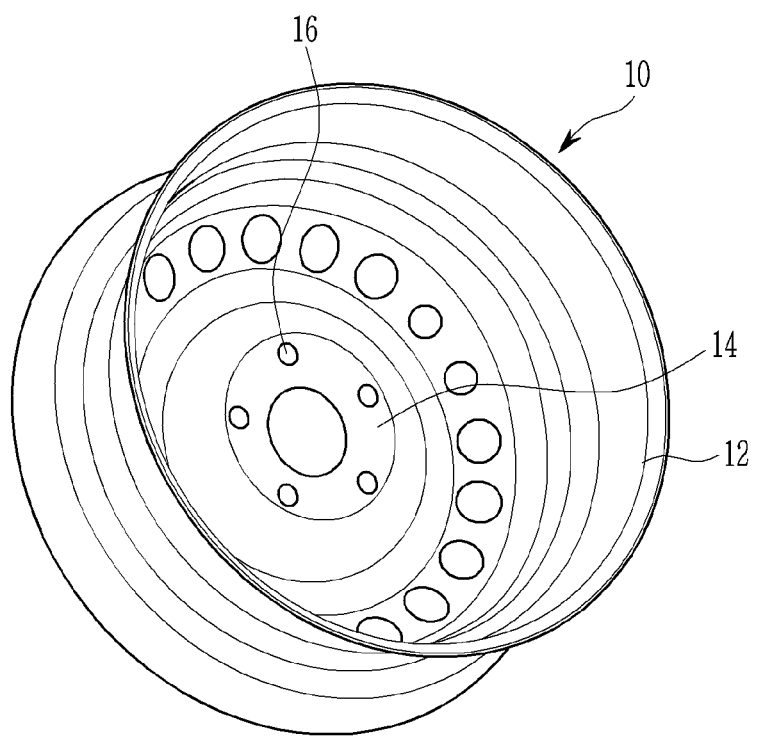
FIG. 2 is a perspective view of a wheel for a vehicle, particularly a spare wheel.

FIG. 1 is a perspective view of a wheel for a vehicle, particularly a spare wheel on which a wheel jack holder according to various exemplary embodiments of the present invention is mounted; FIG. 2 is a perspective view of a wheel for a vehicle, particularly a spare wheel; and FIG. 3 is a perspective view exemplarily illustrating a wheel jack holder according to various exemplary embodiments of the present invention and a wheel jack coupled to each other.

As shown in FIG. 1, a wheel jack holder 30 according to various exemplary embodiments of the present invention is detachably mounted on a wheel 10 of a vehicle, particularly a spare wheel 10 of the vehicle through a wheel jack 20.

As shown in FIG. 2, the spare wheel 10 is formed in a cylinder shape as a whole, and a generally flat wheel disk 14 is formed on a surface of the spare wheel 10 to be mounted on a rotation element of a wheel bearing. At least one bolt hole 16 is formed on the wheel disk 14, and a bolt formed at the rotation element of the wheel bearing may be inserted into the bolt hole 16. A wheel rim 12 corresponding to a side surface of the spare wheel 10 of the cylinder shape extends in an axial direction from the surface of the spare wheel 10, and a tire is mounted to surround the wheel rim 12. The other surface of the spare wheel 10 is opened to form a space inside the spare wheel 10, and the rotation element of the wheel bearing enters the space inside the spare wheel 10 through the other surface of the spare wheel 10 to be mounted on the wheel disk 14 of the spare wheel 10.

Figure 3:
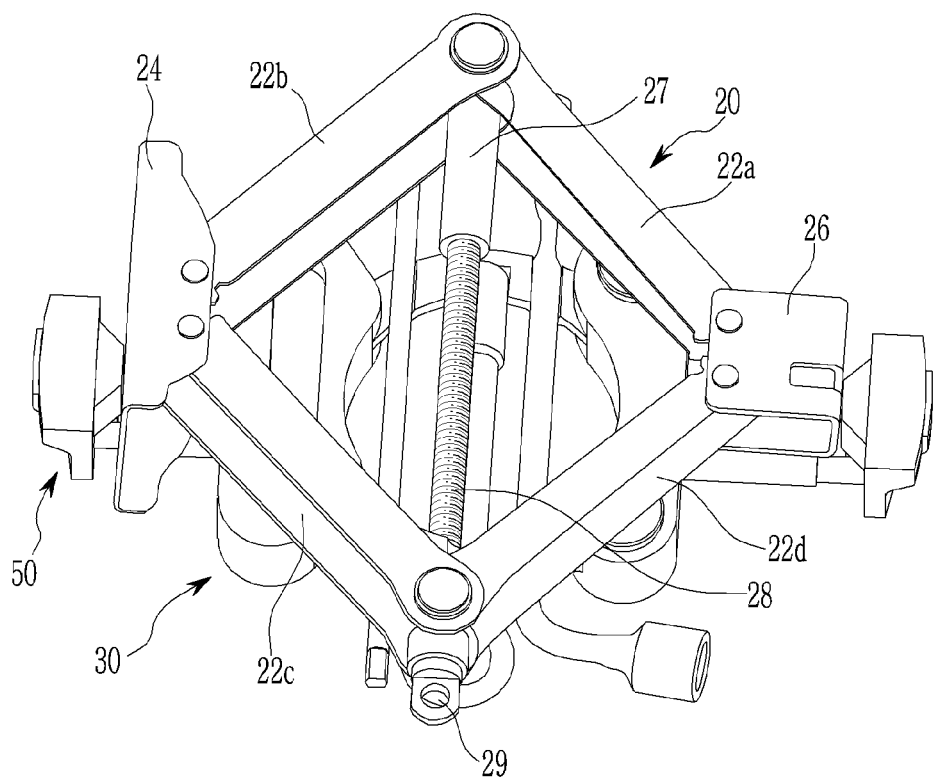
FIG. 3 is a perspective view exemplarily illustrating a wheel jack holder according to various exemplary embodiments of the present invention and a wheel jack coupled to each other.

One example of the wheel jack 20 is illustrated in FIG. 3. As shown in FIG. 3, the wheel jack 20 according to the one example has four jack arms 22a, 22b, 22c, and 22d disposed in a quadrangle shape, a jack base 24 for installing the wheel jack 20 on a ground and the like is provided at one end portion of the wheel jack 20 in a first direction, and a supporting plate 26 for lifting a vehicle body with respect to the ground and the like is provided at the other end portion of the wheel jack 20 in the first direction.

The first jack arm 22a has both end portions, where one end portion of the first jack arm 22a is rotatably mounted at the supporting plate 26.

The second jack arm 22b has both end portions, where one end portion of the second jack arm 22b is rotatably mounted at the other end portion of the first jack arm 22a and the other end portion of the second jack arm 22b is rotatably mounted at the jack base 24.

The third jack arm 22c has both end portions, where one end portion of the third jack arm 22c is rotatably mounted at the jack base 24.

The fourth jack arm 22d has both end portions, where one end portion of the fourth jack arm 22d is rotatably mounted at the other end portion of the third jack arm 22c and the other end portion of the fourth jack arm 22d is rotatably mounted at the supporting plate 26.

The wheel jack 20 according to the one example further includes a jack screw receiving member 27 having a hole and a jack screw rod 28. The jack screw receiving member 27 and the jack screw rod 28 extend in a second direction perpendicular to or substantially perpendicular to the first direction.

A screw is formed on an external circumference of the jack screw rod 28, and one end portion of the jack screw rod 28 in the second direction is rotatably coupled to the other end portion of the third jack arm 22c and the one end portion of the fourth jack arm 22d. A tool coupling hole 29 is formed at one end portion of the jack screw rod 28 in the second direction such that a tool such as a jack handle is coupled to the tool coupling hole 29 to rotate the jack screw rod 28 in the second direction. The jack screw rod 28 extends to the other side in the second direction.

The jack screw receiving member 27 having a hole has a hollow rod shape and a screw threaded to the screw of the jack screw rod 28 is formed on an internal circumference of the hole of the jack screw receiving member 27. The jack screw receiving member 27 extends to one side in the second direction to be threaded to the jack screw rod 28, and the other end portion of the jack screw receiving member 72 in the second direction is rotatably coupled to the other end portion of the first jack arm 22a and the one end portion of the second jack arm 22b.

Therefore, when the tool such as the jack handle is inserted in the tool coupling hole 29 of the jack screw rod 28 and the jack screw rod 28 is rotated about the second direction by the tool, the jack screw receiving member 27 moves along the second direction. Therefore, a distance between the one end portion of the jack screw rod 28 and the other end portion of the jack screw receiving member 27, changing a distance between the jack base 24 and the supporting plate 26 through the first, second, third, and fourth jack arms 22a, 22b, 22c, and 22d rotatably connected to the jack screw rod 28 and the jack screw receiving member 27.

Therefore, the wheel jack 20 can lift up or lower down the vehicle body.

Although the wheel jack 20 according to the one example is described, the wheel jack 20 configured for being applied to the exemplary embodiment of the present invention is not limited to the one example illustrated and described herein.

Referring to FIG. 4, FIG. 5, FIG. 6 and FIG. 7, the wheel jack holder according to various exemplary embodiments of the present invention will hereinafter be described in further detail.

Figure 4:
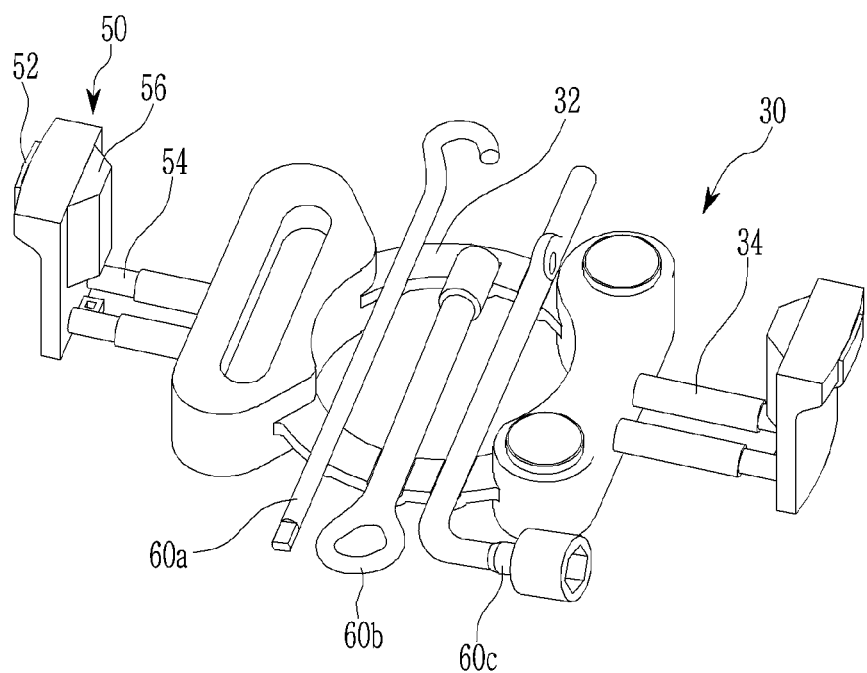
FIG. 4 is a perspective view exemplarily illustrating a wheel jack holder according to various exemplary embodiments of the present invention and tools coupled to each other.
Figure 5:
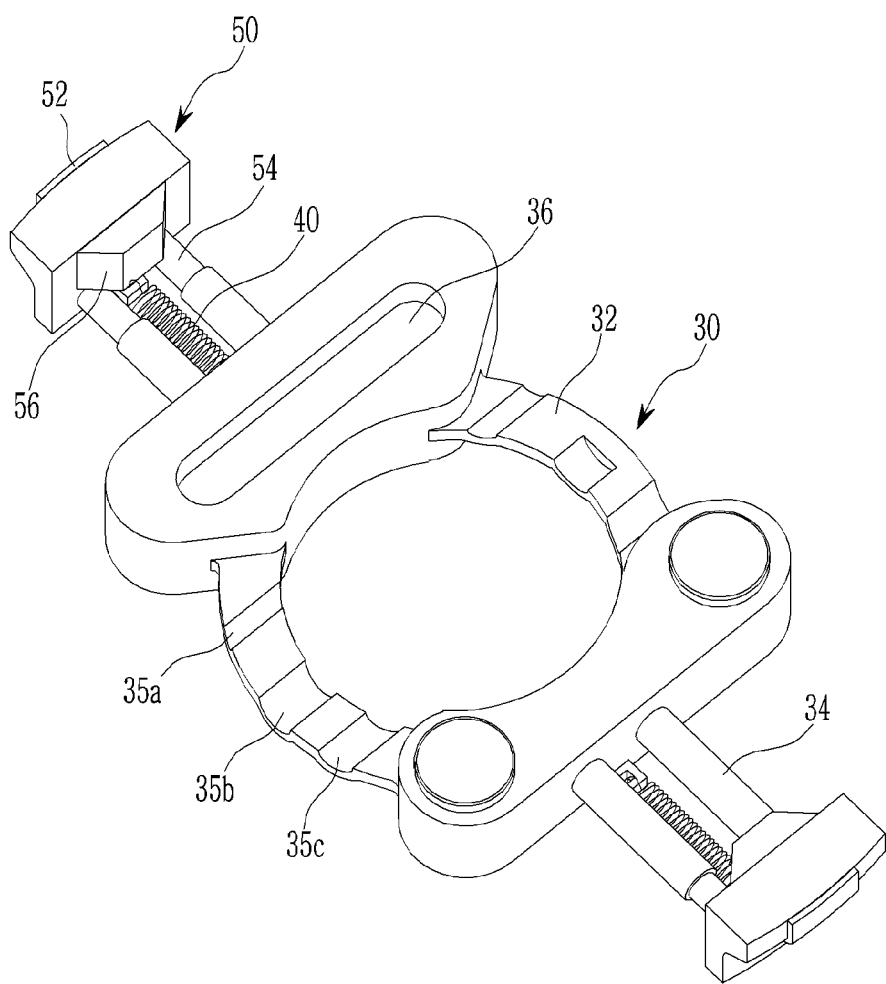
FIG. 5 is a perspective view of a wheel jack holder according to various exemplary embodiments of the present invention.
Figure 6:
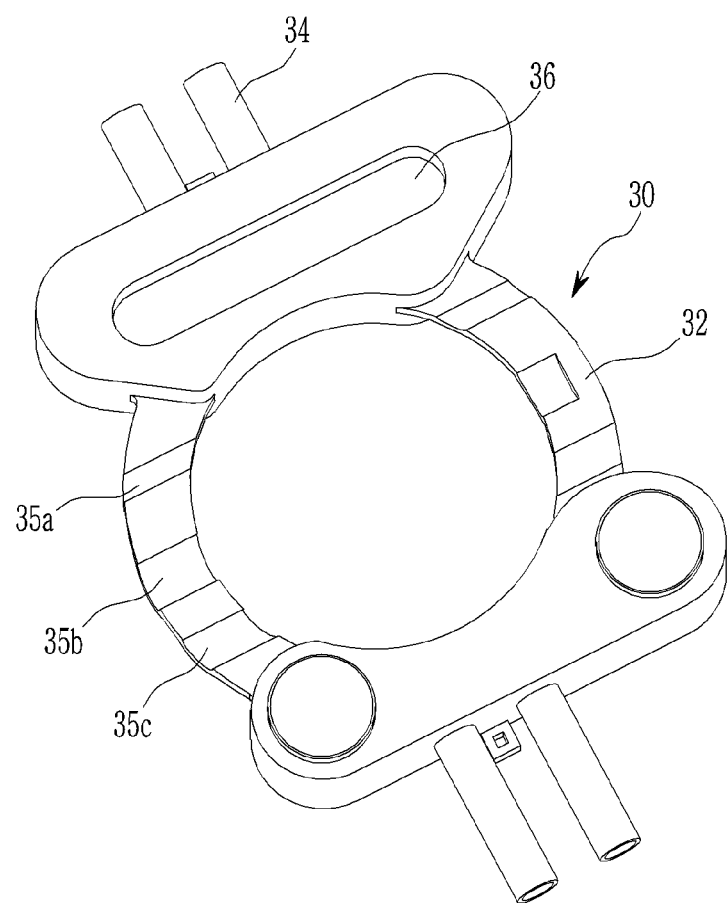
FIG. 6 is a perspective view of a holder base according to various exemplary embodiments of the present invention.
Figure 7:
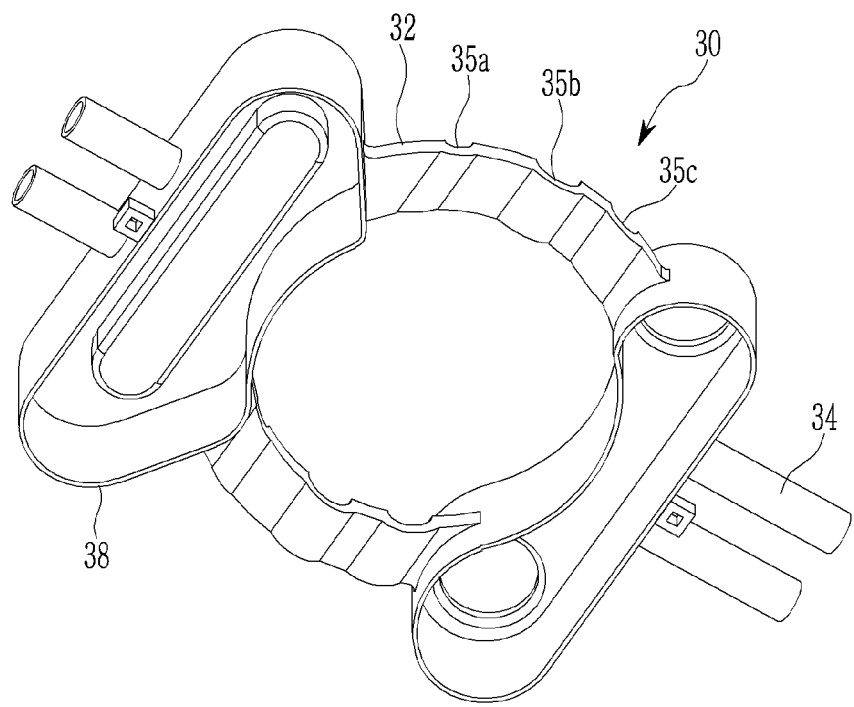
FIG. 7 is another perspective view of a holder base according to various exemplary embodiments of the present invention.

FIG. 4 is a perspective view exemplarily illustrating a wheel jack holder according to various exemplary embodiments of the present invention and tools coupled to each other; FIG. 5 is a perspective view of a wheel jack holder according to various exemplary embodiments of the present invention; FIG. 6 is a perspective view of a holder base according to various exemplary embodiments of the present invention; and FIG. 7 is another perspective view of a holder base according to various exemplary embodiments of the present invention.

The wheel jack holder 30 according to various exemplary embodiments of the present invention may be detachably mounted on the wheel 10 of the vehicle, particularly the spare wheel 10 through the wheel jack 20. As shown in FIG. 4, FIG. 5, FIG. 6 and FIG. 7, the wheel jack holder 30 includes a holder base 32 and a pair of holder arms 50.

As shown in FIG. 4, FIG. 5, and FIG. 6, the holder base 32 generally has a circular plate shape, and at least one sliding member 34 having a hole extends in the first direction, respectively at both end portions of the holder base 32 in the first direction thereof. The holder arm 50 is movably mounted in the hole of the sliding member 34 in the first direction thereof.

At least one tool groove 35a, 35b, and 35c and a wheel nut recess 36 may be formed at an upper surface (one surface in a third direction perpendicular to the first and second directions) of the holder base 32. One of tools 60a, 60b, and 60c such as a wheel wrench, a bar, a toe hook, and the jack handle may be accommodated in each tool groove 35a, 35b, and 35c. Furthermore, a wheel nut separated from the wheel in use may be accommodated in the wheel nut recess 36. Therefore, a loss of the wheel nut may be prevented and storage of the wheel nut may be facilitated by temporarily storing the separated wheel nut in the wheel nut recess 36 to replace the wheel in use with the spare wheel 10.

Here, the first, second, and third tool grooves 35a, 35b, and 35c that can accommodate the first, second, and third tools 60a, 60b, and 60c are shown, but the number of tool grooves which may be formed on the upper surface of the holder base 32 is not limited to three.

As shown in FIG. 7, a supporting edge portion 38 may be protruded downwardly from a lower surface (the opposite surface of the upper surface of the holder base 32) of the holder base 32. The supporting edge portion 38 may be formed at a predetermined position of both the end portions of the holder base 32 in the first direction or the second direction thereof. When mounting the wheel jack holder 30 on the spare wheel 10, the supporting edge portion 38 is supported by the flat wheel disk 14 to prevent unnecessary movement of the wheel jack holder 30 during mounting process.

Each holder arm 50 is mounted at the holder base 32 to be movable in the first direction thereof. To the present end, each holder arm 50 includes a sliding rod 54 and a pad 52.

The pad 52 is attached on one surface of the holder arm 50 and may be securely fixed on the wheel rim 12. The pad 52 may be made of a flexible material such as ethylene propylene rubber (EPDM), polyurethane (PU), and the like to prevent damage of the pad 52 and the wheel rim 12 when the pad 52 is fixed to the wheel rim 12. The material of the pad 52 is not limited to these.

The sliding rod 54 is provided at a lower portion of the other surface of the holder arm 50 (the opposite surface to the one surface of the holder arm 50), and extends in the first direction to be slidably inserted in the hole of the sliding member 34.

The holder arm 50 may further include a mount protrusion 56 formed above the sliding rod 54 at the other surface of the holder arm 50. Since the wheel jack 20 on the wheel jack holder 30, as shown in FIG. 3, is mounted on the spare wheel 10 by pushing the holder arm 50 in the first direction thereof, the sliding rod 54 of the holder arm 50 is positioned at a position corresponding to the holder base 32 and the mount protrusion 56 of the holder arm 50 is positioned at a position corresponding to the jack base 24 and the supporting plate 26 of the wheel jack 20. The mount protrusion 56 can contact with the jack base 24 or the supporting plate 26 of the wheel jack 20, and may have a shape suitable for receiving force from the jack base 24 or the supporting plate 26. The wheel jack 20 itself may be securely mounted on the spare wheel 10 by securely attaching the holder arm 50 to the wheel rim 12 through the mount protrusion 56.

In a state that the pair of holder arms 50 is simply mounted at the holder base 32 (i.e., in a state that the pair of holder arms 50 receives no force from the wheel jack 20), a distance between the pair of pads 52 may be smaller than a diameter of the wheel rim 12 by a predetermined value. At the present state, the wheel jack holder 30 may be inserted in the space of the spare wheel 10 without contacting with the wheel rim 12.

An elastic member 40 may be disposed between each holder arm 50 and the one end portion of the holder base 32. The elastic member 40 provides force for pulling each holder arm 50 to the holder base 32. If the wheel jack 20 does not apply any force to the holder arm 50, the sliding rod 54 of the holder arm 50 is inserted into the sliding member 34 having a hole as deeply as possible. At the present state, when the wheel jack 20 applies force to the holder arm 50, the force overcomes elastic force of the elastic member 40 and pushes the holder arm 50 to the wheel rim 12 so that the wheel jack holder 30 and wheel jack 20 are securely fixed on the spare wheel 10.

Hereinafter, processes of fixing the wheel jack holder 30 according to various exemplary embodiments of the present invention to the spare wheel 10 using the wheel jack 20 will be described in more detail.

Figure 8:
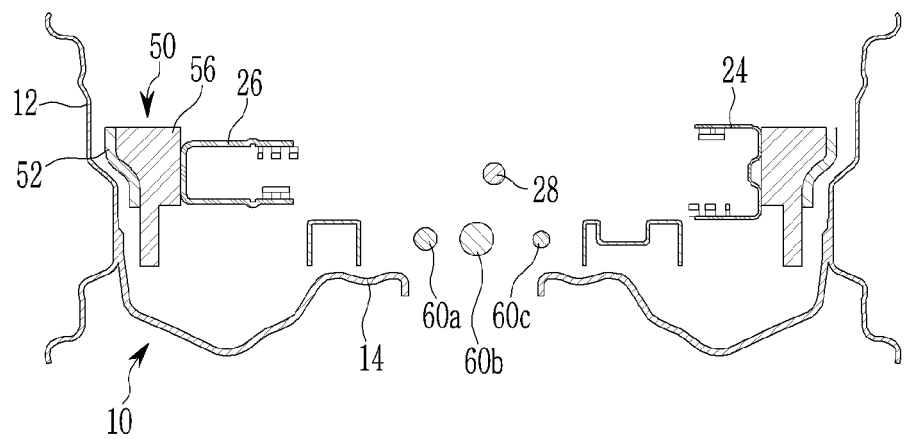
FIG. 8 is a cross-sectional view of a wheel jack holder and a wheel jack before being mounted on a wheel for a vehicle, particularly a spare wheel.
Figure 9:
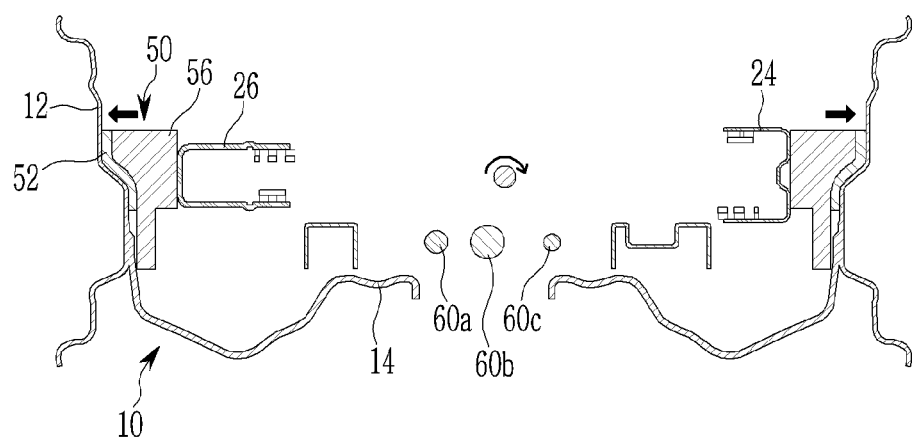
FIG. 9 is a cross-sectional view of a wheel jack holder and a wheel jack when being mounted on a wheel for a vehicle, particularly a spare wheel.

FIG. 8 is a cross-sectional view of a wheel jack holder and a wheel jack before being mounted on a wheel for a vehicle, particularly a spare wheel; and FIG. 9 is a cross-sectional view of a wheel jack holder and a wheel jack when being mounted on a wheel for a vehicle, particularly a spare wheel.

As shown in FIG. 8, the wheel jack holder 30 is inserted into the space in the spare wheel 10. At the instant time, the supporting edge portion 38 protruded from the lower surface of the holder base 32 is mounted on the flat wheel disk 14 to prevent unnecessary movement of the wheel jack holder 30. Furthermore, the first, second, and third tools 60a, 60b, and 60c may be accommodated in the first, second, and third tool grooves 35a, 35b, and 35c.

The wheel jack 20 is placed on the holder base 32. At the instant time, the wheel jack 20 is in a contracted state to be positioned between the pair of holder arms 50, and the jack base 24 and the supporting plate 26 of the wheel jack 20 may contact with the pair of holder arms 50, respectively. At the present state, as shown in FIG. 8, the pads 52 of the pair of holder arms 50 may be distanced from the wheel rim 12 with a predetermined distance.

At the present state, when the tool such as the jack handle is inserted into the tool coupling hole 29 of the jack screw rod 28 and the jack screw rod 28 is rotated in one direction about the second direction thereof, as shown in FIG. 9, the jack screw receiving member 27 moves along the second direction thereof. Therefore, the jack base 24 and the supporting plate 26 push the pair of holder arms 50 to the wheel rim 12 such that the wheel jack holder 30 and the wheel jack 20 are securely fixed to the spare wheel 10.

If replacement of the spare wheel 10 is required, the tool such as the jack handle is inserted into the tool coupling hole 29 of the jack screw rod 28, and the jack screw rod 28 is rotated in the opposite direction about the second direction thereof. In the instant case, since the force applied to the pair of holder arms 50 from the wheel jack 20 disappears, the pair of holder arms 50 is pulled toward the holder base 32 by the elastic force of the elastic member 40. Thus, the wheel jack 20 and the wheel jack holder 30 may be separated from the spare wheel 10.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A wheel jack holder which fixes a wheel jack to a wheel rim of a wheel, wherein the wheel jack includes a jack base provided at a first end portion of the wheel jack in a first direction, a supporting plate provided at a second end portion of the wheel jack in the first direction, and a jack screw receiving member and a jack screw rod provided in a second direction perpendicular to the first direction and threaded to each other, and the supporting plate and the jack base move in the first direction when the jack screw rod rotates about the second direction, the wheel jack holder comprising:
a holder base having at least one sliding member formed at first and second end portions of the holder base in the first direction, wherein the wheel jack is configured for being placed on the holder base;
holder arms, each having a sliding rod formed at a first surface thereof in the first direction, wherein the sliding rod is slidably coupled to the at least one sliding member in the first direction; and
an elastic member provided between the holder base and each holder arm,
wherein the wheel jack is configured to be fixed to the wheel rim of the wheel through the jack base and the supporting plate by pushing the holder arms in the first direction.

2. The wheel jack holder of claim 1, wherein each holder arm is provided with a pad at a second surface thereof in a direction opposite to the holder base.

3. The wheel jack holder of claim 1,
wherein a mount protrusion is formed at the first surface of each holder arm and protrudes toward the holder base.

4. The wheel jack holder of claim 3,
wherein each holder arm receives an external force from the jack base and the supporting plate of the wheel jack through the mount protrusion.

5. The wheel jack holder of claim 3,
wherein the mount protrusion is formed at the first surface of each holder arm in the first direction above the sliding rod.

6. The wheel jack holder of claim 1, wherein at least one tool groove is formed at an upper surface of the holder base.

7. The wheel jack holder of claim 1, wherein a wheel nut recess is formed at an upper surface of the holder base.

8. The wheel jack holder of claim 1, wherein a supporting edge portion protrudes downwardly from a lower surface of the holder base.

* * * * *